INVENTOR.
AKE EKSTROM
BY

United States Patent Office 3,536,985
Patented Oct. 27, 1970

3,536,985
CONTROL SYSTEM FOR INVERTER
Ake Ekstrom, Ludvika, Sweden, assignor to Allmanna
Svenska Elektriska Aktiebolaget, Vasteras, Sweden, a
corporation of Sweden
Filed May 7, 1969, Ser. No. 822,555
Claims priority, application Sweden, May 8, 1968,
6,157/68
Int. Cl. H02m 1/06, 1/18
U.S. Cl. 321—13                                4 Claims

ABSTRACT OF THE DISCLOSURE

A static inverter connecting a D.C. network with an A.C. network has a conductor system with a regulator to control the delay angle of the rectifiers of the inverter with respect to the direct current. In parallel to the regulator, for ensuring a necessary commutation in the valves, are a first member for feeding a certain desired value for the time integral of the commutation voltage during the commutation margin, a second member for predicting at every minute the time integral of the remaining part of the positive half period of the commutation voltage, a third member for calculating the necessary time integral for the commutation of the actual direct current, a fourth member for deriving a correction term and a fifth member which emits an ignition pulse when the output signal from the second member is equal to the sum of the output signals from the first, third, and fourth members. The fourth member is a calculating arrangement which calculates the difference between the time integral predicted by the second member and the real value of the time integral.

BACKGROUND OF THE INVENTION

Field of the invention

The present invention relates to a control system for an inverter to secure the necessary commutation margin for the valves of the inverter.

The prior art

Earlier known systems for controlling the margin are based on calculation or measuring of an angle or a time. Further, the control systems were based on a control function voltage for which a certain curve shape is presupposed, preferably a sine or cosine curve. The control function voltage has been derived from the A.C. network, fed by the inverter, and it has been given a certain desired phase angle in relation to the voltage of this network. This phase angle is often obtained by means of phase shifting circuits, resulting, however, in causing the system to become frequency dependent, and, further, the system often calculates wrong ignition time in case of transients in the A.C. voltage or non-sinusoidal voltages. Due to the fact that the control function voltage is derived from a voltage which is influenced by the ignitions of the valves, an inner, feed-back connected circuit is obtained that may cause instability if the short-circuit power of the A.C. network is not sufficiently great.

SUMMARY OF THE INVENTION

The control system according to the present invention is based on the discovery that ignition should be initiated at such a time that the time integral of the commutation voltage after the conclusion of commutation up to the zero-passage of the voltage is not less than a given preset reference value. The essential idea is to secure a margin for the voltage time integral to secure correct commutation and the subsequently following deionizing of the valves even in case of disturbances in the commutation voltage after the moment of ignition. By making the reference value dependent on the amplitude of the voltage, attention may also be paid to the fact that a certain time is desired for deionizing or recovering after the conducting interval.

The principle of the invention is to provide a member, called a predictor, that for each moment can precalculate or predict the remaining time integral of the commutation voltage until the zero-passage of the commutation voltage. Ignition must thus be initiated when the predicted total voltage time integral is equal to the voltage time integral which is calculated to be necessary for the commutation plus the desired margin. The invention is based on the principle that with relatively good accuracy it should be possible to precalculate—predict—the time up to the zero-passage of the voltage.

A control system according to the invention will then be performed by predicting the remaining voltage time integral from the measured actual value of the commutation voltage and the predicted remaining time to the zero-passage of the voltage. In the simplest form said integral would be the product of these two magnitudes and a suitable constant factor plus a certain correction term.

The prediction of the necessary time for commutating the current is based on the actual value of the direct current and its time derivative, the latter in order to pay attention to possible current change during the commutation interval.

The predictor for the total voltage time integral is corrected—brought up to date—for each zero-passage of the commutation voltage by measuring the real voltage time integral which thereafter should be compared with the predicted value. This is practically done by storing a correction term either for each phase of the feeding voltage or for each separate valve. The actual correction term is always brought up to date when a phase or a valve has finished commutating and the voltage has passed through zero and the correction term is stored to be reconnected again next time the same phase or valve is in turn to commutate. The correction term can suitably be brought up to date with a certain smoothing or limiting, depending, among other things, on the signs of the correction.

With constant curve shape the correction term remains constant and with the same curve shape for all phases it also remains equal in all phases.

It is known in commutating margin control systems to have a correction term which is stored from one commutation to another in which systems, however, the commutation margin is measured as an angle or a time and the difficulty is to make the measuring satisfactorily exact. According to the invention, however, the time integral of the commutation voltage is used both for prediction and correction, which gives greater accuracy, principle as well as practically.

The prediction of remaining time is made by measuring the actual period or half the period time a short time before each commutation. Normally a smoothed value of the measured time is used from which is subtracted the time measured from the latest zero-passage of the actual commutation voltage. In case of sudden transients, when the measured time decreases below the smoothed value by more than a certain given magnitude, an extra correction should be done of the remaining time. The correction could thus be a function of the measured change of period time and the number of corrections entered earlier. In order not to get an unstable system the number of possible corrections should be limited.

The system described so far gives the latest permitted ignition moment for each valve. If this were the only deciding factor for ignition of all valves, the time distance between the successive ignition moments would not be equidistant in case of asymmetrical A.C. voltage. Equidistant ignition is, however, desirable also at moderate asymmetries so that the most critical phase will be decisive for the ignition time of all valves. The system is therefore constructed in such a way that ignition is always obtained when the predicted margin is equal to the desired margin. Simultaneously a signal can be given to the base system that the distance between a number, $n$, of subsequent ignitions shall not be greater than what corresponds to equidistant ignition. The figure $n$ can thus be equal to the pulse number minus one, or half the pulse number minus one, which means that equidistant ignition is obtained during the next following period or half period of the A.C. voltage of the inverter. Resetting is made as soon as a further valve operates at the limit of the commutation margin.

With very great asymmetries in the A.C. voltage it may be desirable not to maintain equidistant ignition. This is achieved by making the system so that a condition for obtaining the above mentioned equidistant ignition is that the margin in the remaining voltage time integral is not too great.

The construction of the system according to the invention is carried out by means of different electronic calculating members, which can today be obtained as standard components for practically any calculation operations.

BRIEF DESCRIPTION OF THE DRAWINGS

The invention will be described further with respect to the enclosed drawing, where FIG. 1a shows the details of parts of FIG. 1, while

DESCRIPTION OF THE PREFERRED EMBODIMENTS

Figure 1:
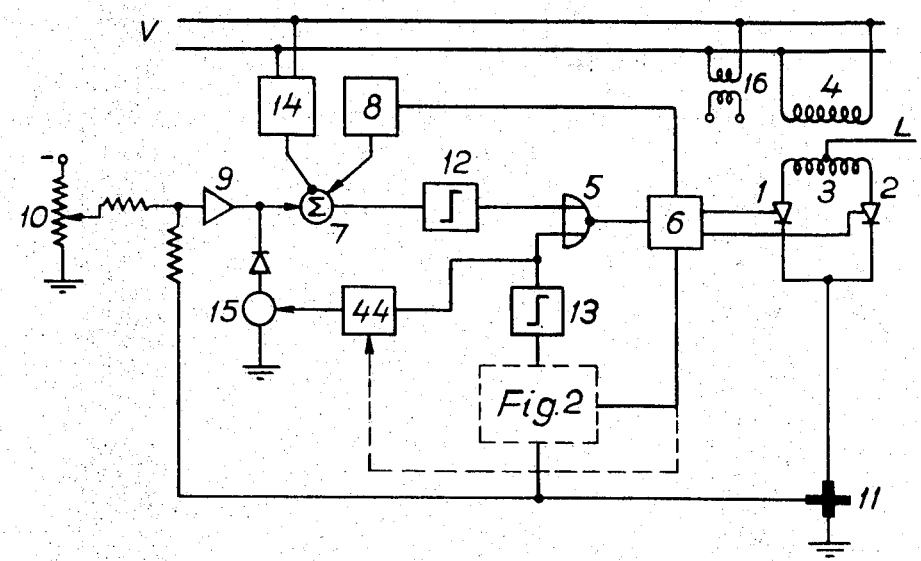
FIG. 1 shows an inverter of known type except for certain new details in the control system.

FIG. 1 shows a single-phase inverter with the pulse number 2, comprising two valves 1 and 2 and a converter transformer with a valve winding 3 and a net winding 4 connected to an A.C. network V. The inverter is fed from a positive D.C. conductor L, connected to a centre terminal of the valve winding 3. The negative connection of the inverter is connected to earth. A control pulse generator 6 has been connected to the control electrodes of the valves 1 and 2, the control pulse generator 6 being operated through an OR-gate 5 either from a discriminator 12 or a discriminator 13. The discriminator 12 belongs to the control system of the inverter for setting a certain desired D.C. current, while the discriminator 13 belongs to the control member according to the invention to secure a certain desired commutation margin in the inverter.

The normal system for the inverter operates, as mentioned, with respect to a certain desired value of a certain operating magnitude of the inverter, for instance the D.C. current, and it comprises a control amplifier 9, the input side of which has been connected on the one hand to an emitter 10, formed like a potentiometer, by which a certain desired current value is preset, on the other hand a means to measure the actual current value in the form of a measuring transductor 11, inserted in the earth connection of the inverter. Both these means are connected to the input side of the amplifier through resistors and the difference between the two input values are amplified and fed to a summation member 7. An integrator 8, which integrates the time from the previous ignition moment, is also connected to the summation member 7.

From the member 14 a voltage is derived which corresponds to the actual time period T divided by the pulse number of the inverter, i.e. in the shown connection a voltage corresponding to half the time period. The members 8 and 14 can be constructed in the same way as the members shown in FIG. 2 with the designations 18, 19, 20, 21, described later on. The function of the members 7, 8, 9, 12 and 14 is seen from FIG. 4, where the time $t$ is the abscissa, while the voltages from the members 8, 9 and 14, designated $u_8$, $u_9$ and $u_{14}$ are ordinates. Supposing the ignition moment is decided by the zero-passage of the input voltage to the discriminator 12, equidistant ignitions with a distance equal to half the time period as shown in FIG. 4 and indicated by the first ignition moments $t_0$, $t_1$ and $t_2$ are obtained as long as the output from the regulator amplifier 9 is zero.

Figure 4:
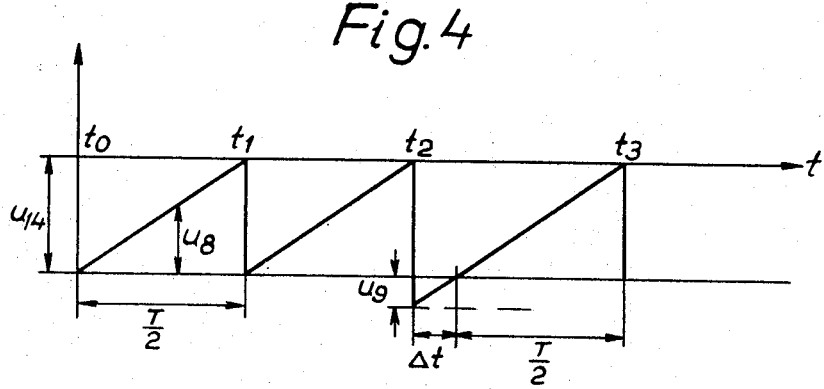
FIGS. 4 and 5 show voltage curves which explain the function of the system.

In FIG. 4 thus half the period time $T/2$ is shown as a substantially constant negative voltage $u_{14}$, to which is added the variable voltage $u_8$ from the member 8. This voltage is cancelled at each ignition and increases thereafter linearly with respect to the time $t$ until it becomes equal to $u_{14}$, the input voltage to the discriminator 12 thus being zero, so that a control pulse to the control pulse generator 6 is emitted.

If the current measured by the transductor 11 during the interval $t_1$–$t_2$ tends to exceed the desired current value set by the potentiometer 10, the input voltage to the regulator amplifier 9 becomes positive and thus a low negative voltage $u_9$ is emitted from the regulator. At the moment $t_2$ this results in a lower initial-output voltage from the member 7, causing a delay $\Delta t$ of the ignition at the next ignition moment $t_3$ as shown in FIG. 4. During stationary operation, however, the output voltage of the regulator amplifier 9, i.e. $u_9$ is equal to zero, and therefore equidistant ignition moments are obtained with the interval length $T/2$.

As shown in FIG. 1 the control pulse generator 6 generates ignition pulses to the valves 1 and 2 and simultaneously also a cancelling pulse to the integrator 8. The method described presupposes that no pulses are obtained from the discriminator 13, so that the ignition moment is only determined by pulses from the discriminator 12.

The system described so far is principally the same as that described in our patent application No. 779,368. It only gives an example of a known control system and can be replaced by any known system for operating a static converter with respect to a certain desired current value, which, in turn, may be derived from another operating magnitude, for instance transmitted power.

Figure 5:
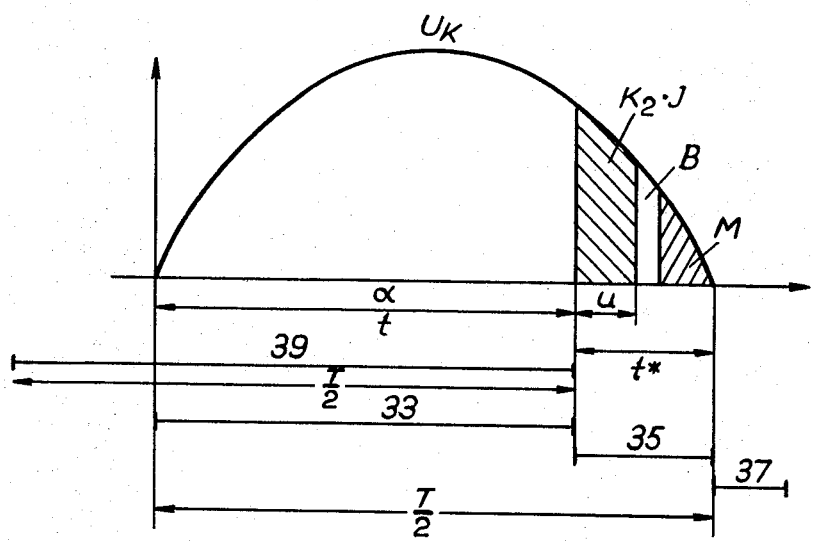

As generally is known within the static converter technique the delay angle $\alpha$, see FIG. 5, may not increase too close to 180°, corresponding to half the period time of the commutation voltage, but a margin has to be left, the so called commutation margin, to secure a certain deionizing time for the valves plus a time corresponding to the commutation of the current between the different phases, the so called overlap time. Owing to this, a second discriminator 13 has been connected to the control pulse generator 6 through OR-circuit 5 and the control system according to the invention shown in FIG. 2 has been connected to the discriminator 13.

Figure 2:
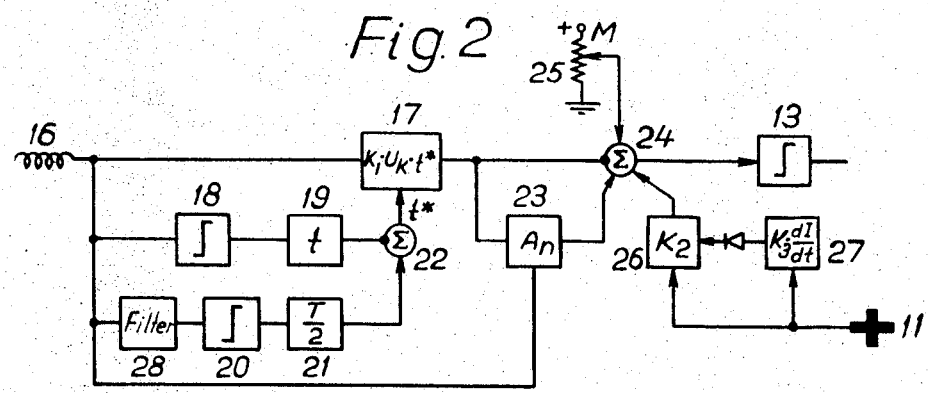
FIGS. 2 and 3 show a control system according to the invention to secure the necessary margin in the voltage time integral corresponding to a certain desired commutation margin and FIGS. 2a and 3a show details of FIGS. 2 and 3, respectively.

In order to explain the system according to FIG. 2 reference is in the first place made to FIG. 5, showing a half period of the commutation voltage $U_K$. The commutation between the valves starts, as mentioned, at the delay or control angle $\alpha$, corresponding to a time $t$ in FIG. 5. The commutation occurs during a certain time, or at angle $u$, and it is known that the time integral of the commutation voltage during this commutation time is proportional to the load current I of the inverter as well as to the inductance of the commutation circuit, comprising the transformer winding 3 between the valves 1 and 2. This time integral is indicated by the sectioned area $K_2 \cdot I$, shown in FIG. 5.

At the very right of FIG. 5 another sectioned area M is shown, corresponding to the necessary minimum margin of the time integral of the commutation voltage $U_K$. There is a no-sectioned area B between the commutation area and the area M and it is obvious that as long as the control angle $\alpha$ is so small that the no-sectioned intermediate area remains $\geq 0$, said margin is achieved. Thus it must be assured that the discriminator 13 emits a control pulse to the control generator 6 at the latest at that moment when the area B becomes zero.

If, previously, a control pulse has been emitted from the discriminator 12, the condition is automatically fulfilled, and no control pulse needs to be generated from the discriminator 13. The system shown in FIG. 2 generates a control pulse from the discriminator 13 at that moment when the area B turns equal to 0, and if theretofore no control pulse has been obtained from the discriminator 12, the pulse from 13 through the OR-gate 5 will activate the control pulse generator 6. There are three inputs for the system according to FIG. 2, namely— the measuring transformer 16, connected to the network V (see FIG. 1) in order to measure the commutation voltage $U_K$, the measuring transductor 11, which gives a measuring value for the load current of the inverter, and an emitter 25 in the form of a potentiometer, by means of which a value corresponding to desired voltage time margin M is preset according to FIG. 5.

At every moment the remaining voltage time integral up to the zero-passage of the commutation voltage, i.e. corresponding to the area $K_2 \cdot I + B + M$ according to FIG. 5 is continuously calculated in the system. In FIG. 5 the corresponding time has been designated $t^*$. The sum of the time $t + t^*$ is equal to half the period $T/2$. The remaining voltage time integral is calculated from the measured actual value of the commutation voltage $U_K$ and the remaining time $t^*$. As no special curve shape is presupposed for the commutation voltage, no simple function can be given that directly gives the remaining voltage time integral from these two magnitudes. A practical way to precalculate or predict this time integral is, however, to choose the product of the actual value of the commutation voltage $U_K$ and the remaining time $t^*$. This precalculation is corrected with a correction term $A_n$ in order to pay attention to a variable curve shape. A special correction term can be chosen for each valve in the actual case, one for valve 1 and one for valve 2, and it is not necessary to presuppose that the two half periods of the commutation voltage are equal. The correction term can be corrected, brought up to date, at each zero passage of the commutation voltage, with respect to the difference between the precalculated voltage time integral and the real, measured time integral from the ignition moment to the zero passage.

The product of the actual value of the commutation voltage and the remaining time is formed in the member 17, see FIG. 2. To the input side of this member are connected magnitudes representing the commutation voltage for the actual phase and the remaining time $t^*$. The latter magnitude is formed as the difference between calculated half period time from the member 21 and the time measured after the nearest preceding zero-passage of the actual commutation phase in the member 19. Member 19, which calculates the time after the preceding zero-passage in the actual commutation phase as well as member 21, which calculates the period time, may be operated by discriminators 18 and 20 respectively, indicating the zero-passages of the commutation voltage. Both members 19 and 21 consist preferably of integrators, integrating the time. In member 21 calculating half the period time, attention should be paid to a number of previous calculations of half the period time by means of smoothing means so that normally only the smoothed value is fed from member 21 to the summation member 22. If, owing to transients in the system, the measured period time is considerably shorter than the stored smoothed value, the value fed to 22 should be corrected for this deviation during a number of subsequently following ignitions. In order to obtain a new calculation of the period time before ignition of the next following valve a filter current 28 has been inserted at the input of the discriminator 20, said filter having a suitable positive phase shifting so that the latest value of the period time is available in good time before ignition occurs.

The output circuit of the integrator 21 thus consists of a storing and a smoothing circuit, emitting a rather constant value which corresponds to half the period time $T/2$. The integrator 19, however, emits a variable value corresponding to the time $t$ after the latest ignition moment.

From the multiplicator 17 is thus obtained a continuous calculation of the product of the actual value $U_K$ of the commutation voltage and the time $t^*$ up to the zero-passage of the commutation voltage multiplied with a suitable factor $K_1$. This value is fed to the summation member 24 with a negative sign. To this member is also fed the correction term $A_n$ from member 23 with a positive sign. From the members 26 and 27 a magnitude is fed corresponding to the precalculated voltage time integral for the commutation of the D.C. current measured in the transductor 11.

The desired margin in voltage time integral is derived from the potentiometer 25. From the summation member 24 a magnitude is thus obtained corresponding to the margin B in FIG. 4. If ignition is not initiated by the discriminator 12 in FIG. 1 before the magnitude from 24 passes zero, a control pulse to the control pulse generator 6 is obtained from the discriminator 13.

The member 26 gives in the first place the product of D.C. current I of the inverter and the above mentioned factor $K_2$ and a first input for 26 is therefore connected directly to the measuring transductor 11.

The purpose of the member 27 is to pay attention to expected change of current during the commutation interval, by reason of which the total cummutating current may be greater than measured actual current at the beginning of the commutation. Said member is a time derivative member connected to the measuring transductor 11 so that from 27 is obtained an output magnitude, $$K_3 \cdot \frac{dI}{dt}$$

where $K_3$ is a constant factor. Said output magnitude is connected to a second input of the member 26, the output magnitude of which is $$K_2\left(I + K_3 \cdot \frac{dI}{dt}\right)$$

A diode is inserted between the members 26 and 27 to show that attention should be paid to positive current derivatives demanding earlier ignition.

The member 23 for calculating the correction magnitude $A_n$ is provided with two inputs, one from the multiplicator 17 and the other from the voltage measuring means 16. Member 23 is shown more in detail in FIG. 3. The figure shows the system for one phase or one valve. In said example with one phase, one or two members are needed. The acual valve of the output magnitude from the member 17 is stored in member 23 at the ignition moment. From the magnitude thus stored is subtracted the voltage time integral of the commutation voltage integrated from the moment of ignition to the zero-passage of the voltage. The difference, if any, is then stored to be used as a new correction term next time a valve in the same phase or probably the same valve should be ignited. In the following a separate correction term is pre-supposed for each valve.

Figure 3:
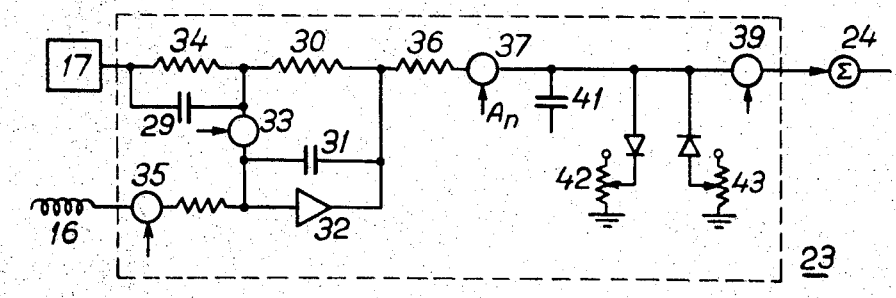

The system shown in FIG. 3 is constructed as a circuit which may operate as an amplifier circuit in which the output magnitude to the electronic switch 37 is directly proportional to the output magnitude from 17. A condition is that the electronic switch 33 conducts, while the switch 35 blocks. If, on the other hand, the switch 33 is blocked and 35 conducting, the circuit will work as a pure integrator. If both 33 and 35 are blocked, the value stored in the capacitor 31 is retained by the amplifier 32 so that a pure memory circuit is obtained. By means of the capacitor 41 between the electronic switches 37 and 39 an extra memory circuit is obtained. The latter can, of course, also be improved by an amplifier circuit.

The electronic switches 33, 35, 37 and 39 are operated from different control pulses on their control inputs. The system will now be described from a moment before the margin B in FIG. 5 has passed zero, i.e. before ignition occurs.

In the capacitor 41 is stored a voltage corresponding to the previously calculated correction term $A_n$ of the actual valve. The electronic switch 39 is conducting and 37 blocked and thus the correction term is fed to the summation means 24. During this interval the electronic switch 33 is also conducting, while 35 is blocked, and thus capacitor 31 is charged and its voltage follows the output voltage from member 17, i.e. the product $K_1 \cdot U_K \cdot t^*$. At the ignition moment the switch 33 is blocked, while 35 is released. Further, switch 39 is blocked, while the corresponding switch for the next following valve is opened, i.e. the next correction term from a member similar to 23 is fed to the summation member 24. During the interval, from ignition up to the zero-passage of the commutation voltage, switch 35 is conducting and the amplifier circuit 31, 32 then acts as an integrator and the time integral of the commutation voltage $U_K$ is integrated at the same time as it is subtracted from the earlier stored value $K_1 \cdot U_K \cdot t^*$ which was stored in the capacitor 31 at the ignition moment. When the commutation voltage passes zero, the electronic switch 35 is blocked and the value now stored in the capacitor 31, corresponding to a new adjusting of the correction term $A_n$, is fed into the capacitor 41 by making the switch 37 conducting during a certain interval. By limiting the length of this interval and by inserting a series resistor 36 a certain smoothing can be obtained so that the correction term $A_n$, stored in the capacitor 41, also considers correction terms calculated earlier. The calculation of the correction term will also take place even if ignition is not initiated from discriminator 13, i.e. if the current is controlled from the discriminator 12. The calculation will be substantially correct, provided that margin B is not too great at the ignition moment. With smaller values of the ignition angle α, for instance with rectifier operation when B is very great, the calculated correction term will be wrong. To avoid disturbances in the system when rapidly changing over from rectifier to inverter operation limitations are made of the stored voltage in the capacitor 41, for instance with the diodes 42 and 43, shown in FIG. 3.

The function of the switches 33, 35, 37 and 39 is shown in FIG. 5, where the conducting intervals of these switches have been indicated. As mentioned, the switch 39 is connected as soon as ignition occurs of the previous valve in the ignition sequence, so that the conducting interval for 39 is the time period T divided by the pulse number, in the shown case T/2. The switch 39 is thus suitably operated by the ignition pulses of the control pulse generator 6, for instance, over the flip-flop-connection. The member 17 should be connected to the capacitor 31 by means of the switch 33 during the positive half period of the commutation voltage up to the ignition moment. Therefore the switch 33 may suitably be operated by the positive voltage over the proper valve, the so called blocking voltage. The switch 35 should be conducting from the moment of ignition until the zero-passage of the commutation voltage. It can therefore be operated by a flip-flop-connection, which is connected from the control pulse generator 6 and disconnected by a discriminator, connected to the commutation voltage. Said discrimminator also may connect switch 37, when 35 is blocked and the control input of the switch 37 suitably is made as holding circuit with a certain resetting time, which is decided by the desired smoothing in the correction term.

Said description of the connection and blocking of the switches 33, 35, 37 and 39 should only be taken as an example, as the different junction points in the diagram of FIG. 5 may be recognized in several connection points in FIGS. 1 and 2. It is thus a question of practical performance from which points of the system said switches should be controlled.

It is further known from the converter technique that the commutation margin or the margin in the time integral of the commutation voltage should be dependent on the current by containing a term which is proportional to the load current of the converter. Such a term could for instance be inserted by dimensioning the correction factor $K_2$ in member 26 of FIG. 2 for some other value than that corresponding exactly to commutation interval $u$ in FIG. 5. Alternatively the magnitude M from from the member 25 can be made dependent on the current by adding a current dependent additional magnitude to the voltage from the potentiometer 25.

With asymmetries in the A.C. voltage of the converter it is normally desirable to ignite the valves with equidistant ignition intervals provided there is a necessary margin in the voltage time integral in the most critical valve. This means that the margin B according to FIG. 5 becomes zero in at least one valve, but may be greater than zero in other valves. To achieve this, the member 44 and the member 15 have been inserted in FIG. 1. If the electronic switch 15 is conducting, the voltage from the regulator amplifier 9 is limited to positive values or zero. This means that with normal inverter operation when a greater current order is set in the rectifier station than in the inverter station, the output voltage from the regulator 9 is limited to 0 as long as the member 15 is conducting. This means that the distance between subsequent following ignitions can not be greater than the time period divided by the pulse number, in actual case equal to the half the time period. As soon as a valve has received an ignition pulse through the discriminator 13, i.e. when $B=0$, a pulse is also fed to the member 44. This member can be a time circuit or a calculator, which during a certain time or a certain number of ignitions gives a control pulse to the electronic switch 15 so that this becomes conducting. With this control principle, where the ignition can be determined either from 13, i.e. on the least permitted margin, or with equidistant intervals between subsequently following ignitions, equidistant ignitions are obtained where the most critical valve will operate with the margin $B=0$.

In a 6-pulse current converter, the duration of the pulse from the member 44 is suitably chosen so that the switch 15 is conducting during the two following ignitions or alternatively during the five following ignitions, i.e. during a half or a whole period of the A.C. voltage of the inverter. After this it is desirable again to get an exact calculation of the latest permitted ignition moment. If new ignition pulses should be obtained from the member 13 during said half or whole period, a new period is automatically started by the member 44.

It is thus seen that the member 44 is activated from the discrminator 13. If its activity thereafter is to be determined by the number of ignition pulses, it is provided with an extra input from the control pulse generator 6, as is shown by the dotted connection in FIG. 1.

With other types of control systems than that shown by the circuit 9–12 in FIG. 1, there may be other values of the limitation of the output voltage of the regulator 9 provided by the member 15. Under all circumstances said output voltage should correspond to constant control angle and thus equidistant ignitions.

By adding the extra condition that the electronic switch 15 only should be conducting if the margin B is less than a certain maximum value, $B_{max}$, a system is obtained which gives equidistant ignitions with moderate asymmetries. With great asymmetries where $B > B_{max}$ at the moment of equidistant ignition, the ignition is delayed until $B = B_{max}$. This system makes it possible in case of great asymmetries in the A.C. network to obtain a higher D.C. voltage from the converter than would be possible if the demand for equidistant ignition strictly was maintained as with great asymmetries and equidistant ignition and absurdly great commutation margin for certain valves would be the result. Consequently the inverter would not be utilized to its full capacity. For the sake of simplicity the system according to this special principle has not been shown in FIGS. 1 and 2.

Figure 1A:
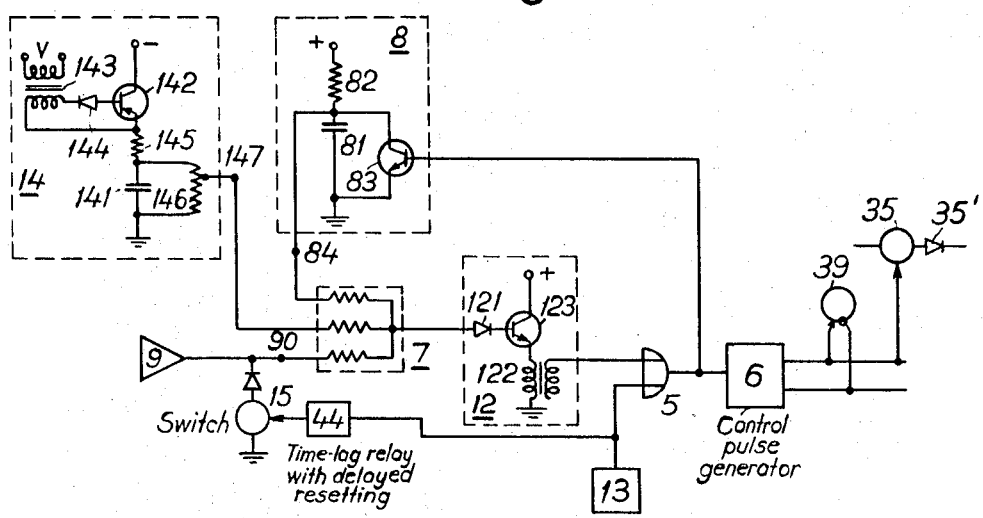
Figure 2A:
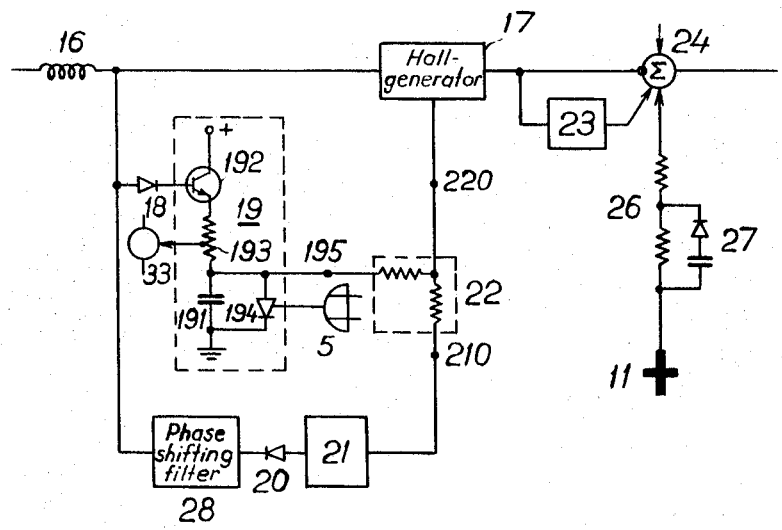
Figure 3A:
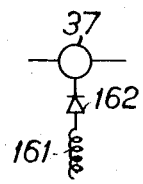

FIGS. 1a, 2a and 3a show parts of FIGS. 1-3 respectively in order to show examples of how some of the components in FIGS. 1-3 could be constructed in details.

In FIG. 1a the member 14 for measuring the time period comprises an integrating means in the form of a capacitor 141 which is changed from a negative voltage source over a transistor 142 and a resistor 145. The transistor 142 is controlled from a half period of the voltage of the A.C. network in FIG. 1 through a voltage transformer 143 and a diode 144 so that the transistor is conductive during the negative half periods of said A.C. voltage. The capacitor 141 is rather large and it is parallel connected with a rather large resistor 146 so that the capacitor voltage will be relatively constant. The capacitor voltage which corresponds to $T/2$ is brought up to date for every half period and depending on the magnitude of resistor 145 in relation to the capacitor 141 and resistor 146 a certain smoothing of the capacitor voltage is obtained. Thus the output voltage $u_4$ on terminal 147 will be proportional to $T/2$. The member 8 for measuring the time after the last ignition is also an integrator comprising a capacitor 81 charged from a positive voltage source over a resistor 82. The capacitor 81 is parallel-connected with a transistor 83 controlled from the OR-gate 5 or the control pulse generator 6, so that each time a control pulse is delivered to one of the rectifiers 1 or 2 in FIG. 1, the capacitor 81 is short circuited and discharged. Thereafter the voltage over the capacitor increases so that the output voltage $u_8$ on terminal 84 is proportional to the time after the last ignition.

The summation member 7 comprises parallel resistors for the inputs from terminals 90, 147 and 84 with the voltages $u_9$, $u_{14}$ and $u_8$ respectively. The summation members 22 and 24 in FIG. 2 are built-up in the same way and the symbols (arrow and ring) on the inputs represent opposite input polarities.

The output from 7 is fed to the discriminator 12 comrising a diode 121 and a pulse transformer 122, the primary winding of which is fed from a positive voltage source over a transistor 123. The secondary winding of 122 is connected to the OR-gate 5. Thus when the output voltage $u_8$ from 8 exceeds $u_{14}-u_9$, the output from 7 becomes positive and the transistor 123 becomes conductive so that the transformer 122 delivers a pulse to the OR-gate 5 which in its turn delivers a pulse to the control pulse generator 6 so that one or the other of the rectifiers 1 and 2 in FIG. 1 is made conductive. The pulse from 5 also connects the output on 84 so that a new period is initiated.

The discriminator 13 is constructed in a similar way to 12 so that 12 and 13 are equivalent in their operation over the OR-gate 5. The member 44, influenced from 13 is a time-lag relay means with delayed resetting and a resetting time of nearly $T$ or $T/2$. The electronic switch 15, controlled from 44, has the character of a make contact relay and could simply be a transistor.

In FIG. 2a are shown details of the members in FIG. 2. The discriminator 18 is simply shown as a diode which connects the positive half periods of the voltage from transformer 16 to the integrator 19. This is made like a combination of members 8 and 14 in FIG. 1a and comprises a capacitor 191, charged from a positive voltage source over a resistor 193 and a transistor 192 controlled from the positive half periods from 16. The capacitor 191 is parallel-connected with a thyristor 194, controlled from the pulses from the OR-gate 5. Thus, when the voltage from 16 becomes positive the transistor 192 becomes conductive and the capacitor 191 is charged so that its voltage on terminal 195 is proportional to the time $t$ from the zero passage of the commutation voltage. When a pulse from the OR-gate 5 is delivered to 6, the thyristor 194 is made conductive and remains conductive during the remaining part of the positive half period from 16, so that the capacitor 191 is short-circuited and discharged. When the voltage from 16 becomes positive again, the capacitor is charged and thus measures the time $t$ for the next period.

The filter 28 is a phase shifting filter. The discriminator 20 is shown as a diode and corresponds to diode 144 in FIG. 1a and the integrator 21 is similar to 14 in FIG. 1a so that the output on terminal 210 is proportional to $T/2$.

The outputs on 195 and 210 are connected with opposite polarities to the summation members 22 so that the output on terminal 220 is $$\frac{T}{2}-t=t^*$$

The multiplication member 17 can be a Hall-generator with the inputs $U_K$ from 16 and $t^*$ from 220 so that the output in $K_1.U_K.t^*$. This output is connected on the one hand directly to the summation member 24 on the other hand to the correction member 23, shown more in detail in FIG. 3.

To 24 is also connected the measuring transductor 11 over the current members 26 and 27. 26 is substantially a pure resistive branch, while 27 is a capacitive branch, connected in parallel to a part of 26. 27 also comprises a diode as shown. Thus, with an increasing current in the inverter a charging current passes the capacitor, while with a decreasing current the capacitor is blocked from the diode. Thus, the signal from 11 to 24 will be $$K_2\left(I+K_3\frac{dI}{dt}\right)$$

when $dI/dt$ is positive, while, if $dI/dt$ is zero or negative, the signal will be $K_2I$.

The switches 33, 35 and 37 in FIG. 3 have the character of make contact relays. Thus these switches would be transistors. As mentioned earlier the switch 33 should be conductive during the period $t$. This is also the charging period for the capacitor 191 in FIG. 2a, so that 33 could be controlled from a tapping on the resistor 193, as shown in FIG. 2a.

The switch 35 should be conductive during the period $t^*$ according to FIG. 5. For this reason 35 could be controlled from the control pulse generator 6 if 35 is connected in series with a diode 35' as shown in FIG. 1a. This means that 35 is opened from 6 and blocked by 35' when the voltage from 16 changes polarity and becomes negative.

The switch 37 should be conductive for a short period after the commutation voltage becomes negative. Thus 37 could be controlled from a pulse transformer winding 161 on the voltage transformer 16 in series with a diode 162, as shown in FIG. 3a. With suitable dimensioning of said pulse winding a suitable pulse length and thus a suitable conductive period for 37 is obtained.

According to FIG. 5 the switch 39 should pick-up at one ignition pulse from 6, and drop-out at the next ignition pulse. Thus, 39 could have the character of a throwover relay or a flip-flop circuit which is picked up by one pulse and dropped out by another pulse. In FIG. 1a this is indicated in that way that 39 is controlled from the two outputs from 6 but with opposite signs indicated by an arrow and a ring, where the arrow indicates pick-up function, while the ring indicates drop-out function.

I claim:

1. Static inverter connecting a D.C. network with an A.C. network and having a control system comprising a regulator (9) to control the delay angle of the rectifiers of the inverter with respect to a certain operating magnitude, and in parallel thereto a means to ensure a necessary commutation margin in the valves of the inverter, in which said means comprises a first member (25) to set a certain desired value for the time integral of the commutation voltage during the commutation margin, a second member (17) to predict at every moment the time integral of the remaining part of the positive half period of the commutation voltage, a third member (26) to calculate the necessary voltage time integral for the commutation at the actual direct current, a fourth member (23) to derive a correction term and a fifth member (24, 13) which emits an ignition pulse when the output signal from the second member (17) is equal to the sum of the output signals from the first, third and fourth members (25, 26, 23); said fourth member (23) comprising a calculating means which calculates the difference between the time integral predicted by the second member (17) and the real value of said time integral.

2. Control system according to claim 1, in which said second member (17) comprises a calculator which continuously calculates the product of the actual commutation voltage and said remaining part of the positive half period and a correction factor.

3. Control system according to claim 1 in which the regulator (9) is provided with a limiting device (15) controlled from the output (13) from said fifth member in such a way that an output signal from said member during a certain time causes a limitation of the output signal of the regulator corresponding to a constant delay angle in the inverter.

4. Control system according to claim 1 having means responsive to great asymmetry in the A.C. network connected to the inverter to put said limiting device (15) out of operation.

References Cited

UNITED STATES PATENTS 3,458,795  7/1969  Ainsworth _____ 321—13 X
3,474,321  10/1969  Ainsworth _____ 321—5

OTHER REFERENCES

IEEE Transactions on Power Apparatus and Systems, "A Method To Detect the Deionization Margin Angle and To Prevent the Commutation Failure of an Inverter for D.C. Transmission," vol. Pas–86, No. 3, pp. 259–262, March 1967.

WILLIAM H. BEHA, JR., Primary Examiner

U.S. Cl. X.R.
321—18, 40, 45